No. 775,119. Patented November 15, 1904.

UNITED STATES PATENT OFFICE.

GREGOIRE SCHLEBIE, OF PASSAIC, NEW JERSEY.

BELT-DRESSING.

SPECIFICATION forming part of Letters Patent No. 775,119, dated November 15, 1904.

Application filed February 25, 1904. Serial No. 195,205. (No specimens.)

*To all whom it may concern:*

Be it known that I, GREGOIRE SCHLEBIE, a citizen of the United States, residing in the city of Passaic, county of Passaic, and State of New Jersey, have invented certain new and useful Improvements in Belt-Dressing; and I do hereby declare the following to be a full, clear, and exact description of the invention, such as will enable others skilled in the art to which it appertains to make and use the same.

This invention relates to dressing for driving belts or bands for the purpose of reducing friction and preventing heating, and thus increasing the life of said belts or bands.

The object of this invention is to provide a belt or band dressing which is cheap and effective and which will not easily decompose and which can be quickly prepared.

The invention consists in the improved compound or dressing composed of a vegetable oil, such as linseed-oil, chlorid of lime, chalk, and spirits of camphor, compounded in the manner and proportions substantially as hereinafter specified.

In carrying the invention into effect I take six ounces chlorid of lime and one and one-half ounces of chalk and mix the same thoroughly with one-half ounce of spirits of camphor. Eight ounces of raw linseed-oil are then added and likewise mixed with the other ingredients.

The compound thus produced is especially designed for the use on driving bands or belts, which by its means are kept cool and flexible and are prevented from cracking, and thus have their life prolonged.

It may be well to remark that although I have selected the ingredients to be compounded in the proportions stated the said proportions may be changed as economy in the cost and quality of the ingredients or the adaptation to particular purposes or other circumstances may render expedient.

Having thus described my invention, what I claim as new is—

1. A belt-dressing, consisting of a vegetable oil, of chlorid of lime, chalk, and spirits of camphor, substantially as described.

2. A belt-dressing, consisting of a vegetable oil, of chlorid of lime, chalk, and spirits of camphor, compounded substantially in the proportions specified.

3. A belt-dressing, consisting of linseed-oil, chlorid of lime, chalk, and spirits of camphor, substantially as described.

4. A belt-dressing, consisting of linseed-oil, chlorid of lime, chalk, and spirits of camphor, compounded substantially in the proportions specified.

In witness whereof I have hereunto set my hand in presence of two witnesses.

GREGOIRE SCHLEBIE.

Witnesses:
 WILLIAM P. HURLEY,
 WENDEL ROEHRICH.